(12) United States Patent
Duan et al.

(10) Patent No.: US 6,778,949 B2
(45) Date of Patent: *Aug. 17, 2004

(54) METHOD AND SYSTEM TO ANALYZE, TRANSFER AND GENERATE LANGUAGE EXPRESSIONS USING COMPILED INSTRUCTIONS TO MANIPULATE LINGUISTIC STRUCTURES

(75) Inventors: Lei Duan, Cupertino, CA (US); Alexander Franz, Palo Alto, CA (US); Keiko Horiguchi, Palo Alto, CA (US)

(73) Assignees: Sony Corporation, Tokyo (JP); Sony Electronics Inc., Park Ridge, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/420,511

(22) Filed: Oct. 18, 1999

(65) Prior Publication Data
US 2003/0036898 A1 Feb. 20, 2003

(51) Int. Cl.[7] .......................... G06F 17/28; G06F 17/27
(52) U.S. Cl. ............................................. 704/2; 704/9
(58) Field of Search ............................. 704/2–7, 9, 10; 707/536, 530; 717/136, 139–143

(56) References Cited

U.S. PATENT DOCUMENTS

| | | |
|---|---|---|
| 4,905,138 A | 2/1990 | Bourne |
| 4,974,191 A | 11/1990 | Amirghodsi et al. ......... 364/900 |
| 5,068,789 A | 11/1991 | van Vliembergen |
| 5,083,268 A | 1/1992 | Hemphill et al. |
| 5,088,038 A | 2/1992 | Tanaka et al. |
| 5,095,432 A | 3/1992 | Reed |
| 5,111,398 A | 5/1992 | Nunberg et al. |
| 5,418,717 A | 5/1995 | Su et al. ................. 364/419.08 |
| 5,426,583 A | 6/1995 | Uribe-Echebarria Diaz De Mendibil ........................ 364/419.08 |
| 5,510,981 A | 4/1996 | Berger et al. |

(List continued on next page.)

FOREIGN PATENT DOCUMENTS

EP 805 403 A2 5/1997

OTHER PUBLICATIONS

Timothy C. Bell et al., "Chapter 8: Dictionary Techniques", Text Compression, Prentice Hall PTR, Englewood Cliffs, New Jersey 07632, pp. 206–243.
PCT Search Report dated Apr. 4, 2001, 4 pages.
PCT Search Report dated Feb. 22, 2001, 5 pages.

(List continued on next page.)

*Primary Examiner*—Patrick N. Edouard
(74) *Attorney, Agent, or Firm*—Blakely, Sokoloff, Taylor & Zafman LLP

(57) ABSTRACT

A natural language translation system contains language-neutral modules for syntactic analysis, transfer, and morphological and syntactical generation of feature structures for an input expression in a source and a target language. The language-neutral modules are driven by language-specific grammars to translate between the specified languages so that no knowledge about the languages need be incorporated into the modules themselves. The modules interface with the grammar rules in the form of compiled grammar programming language statements that perform the required manipulation of the feature structures. Because the modules are language-neutral, the system is readily adaptable to new languages simply by providing a grammar for the new language. Multiple copies of each module, each interfacing with a different natural language grammar, enables simultaneous translation of multiple languages in the same system.

52 Claims, 9 Drawing Sheets

U.S. PATENT DOCUMENTS

| | | | | |
|---|---|---|---|---|
| 5,528,491 A | * | 6/1996 | Kuno et al. | 704/3 |
| 5,535,120 A | | 7/1996 | Chong et al. | 364/419.03 |
| 5,642,519 A | * | 6/1997 | Martin | 704/255 |
| 5,644,775 A | | 7/1997 | Thompson et al. | |
| 5,659,765 A | * | 8/1997 | Nii | 704/5 |
| 5,677,835 A | | 10/1997 | Carbonell et al. | |
| 5,680,511 A | | 10/1997 | Baker et al. | |
| 5,768,603 A | | 6/1998 | Brown et al. | |
| 5,799,268 A | | 8/1998 | Boguraev | 704/9 |
| 5,806,021 A | | 9/1998 | Chen et al. | 704/9 |
| 5,864,788 A | * | 1/1999 | Kutsumi | 704/2 |
| 5,873,056 A | | 2/1999 | Liddy et al. | 704/9 |
| 5,884,247 A | | 3/1999 | Christy | |
| 5,907,821 A | | 5/1999 | Kaji et al. | 704/4 |
| 5,963,894 A | | 10/1999 | Richardson et al. | 704/9 |
| 5,966,686 A | | 10/1999 | Heidorn et al. | |
| 5,983,169 A | * | 11/1999 | Kozma | 704/2 |
| 6,131,082 A | | 10/2000 | Hargrave, III et al. | |
| 6,161,083 A | * | 12/2000 | Franz et al. | 704/4 |
| 6,173,441 B1 | | 1/2001 | Klein | |
| 6,243,669 B1 | * | 6/2001 | Horiguchi et al. | 704/9 |
| 6,285,978 B1 | | 9/2001 | Bernth et al. | |
| 6,301,554 B1 | | 10/2001 | Christy | |

OTHER PUBLICATIONS

S. Kurohashi, T. Nakamura, Y. Matsumoto, M. Nagao. Improvements of Japanese Morphological Analyzer JUMAN. In: "Proceedings of the International Workshop on Sharable Natural Language Resources", p. 22–28, Nara, Japan, 1994.

Kenneth W. Church, "A Stochastic Parts Program and Noun Phrase Parser for Unrestricted Text", in Proceedings of the Second Applied Natural Language Processing Conference, Austin, TX, 1988.

Edited by Karen Jensen, George E. Heidorn, Stephen D. Richardson, "Natural Language Processing: The PLNLP Approach", Kluwer Academic Publishers, 1993, 22 pages.

Stuart M. Shieber, An Introduction to Unification–based Aproaches to Grammar, CSLI, 1986, 23 pages.

M. Tomita, T. Mitamura, H. Musha, M. Kee, "The Generalized LR Parser/Compiler Version 8.1: User's Guide", CMU–CMT–88–MEMO, Apr. 20, 1988, 44 pages.

M. Tomita, K. Knight, "Pseudo–Unification and Full–Unification", CMU, 1987, 10 pages.

M. Ishii, K. Ohta, H. Saito, "An Efficient Parser Generator for Natural Language", COLING 1994, 3 pages.

O. Furuse, H. Iida, "Example–Based Method for Transfer–Driven Machine Translation", Proceedings of the Conference on Theoretical and Methodological Issues in Machine Translation (TMI–92), 1992, p. 139–150.

P. Resnik, "Using Information Content to Evaluate Semantic Similarity in a Taxonomy", Proceedings of the International Joint Conference on Artificial Intelligence (IJCAI–95), 1995.

T. C. Bell, J. G. Cleary, I. H. Witten, "Text Compression", Prentice Hall, 1990, 19 pages.

H. Maruyama, H. Watanabe, "Tree Cover Search Algorithm for Example–Based Translation", in Proceedings of the Fourth International Conference on Theoretical and Methodological Issues in Machine Translation (TMI–92), 1992, p. 173–184.

PCT Search Report dated Jan. 29, 2001, 6 pages.

PCT Search Report dated Jan. 31, 2001, 5 pages.

* cited by examiner

METHOD AND SYSTEM TO ANALYZE, TRANSFER AND GENERATE LANGUAGE EXPRESSIONS USING COMPILED INSTRUCTIONS TO MANIPULATE LINGUISTIC STRUCTURES

FIELD OF THE INVENTION

This invention relates generally to natural language translation, and more particularly to manipulating linguistic structures that represent natural language expressions.

BACKGROUND OF THE INVENTION

With the continuing growth of multinational business dealings where the global economy brings together business people of all nationalities and with the ease and frequency of today's travel between countries, the demand for a machine-aided interpersonal communication system that provides accurate near real-time language translation is a compelling need. This system would relieve users of the need to possess specialized linguistic or translational knowledge.

A typical language translation system functions by using natural language processing. Natural language processing is generally concerned with the attempt to recognize a large pattern or sentence by decomposing it into small subpatterns according to linguistic rules. A natural language processing system uses considerable knowledge about the structure of the language, including what the words are, how words combine to form sentences, what the words mean, and how word meanings contribute to sentence meanings.

Morphological knowledge concerns how words are constructed from more basic units called morphemes. Syntactic knowledge concerns how words can be put together to form correct sentences and determines what structural role each word plays in the sentence and what phrases are subparts of what other phrases. Typical syntactic representations of language are based on the notion of context-free grammars, which represent sentence structure in terms of what phrases are subparts of other phrases. This syntactic information is often presented in a tree form. Semantic knowledge concerns what words mean and how these meanings combine in sentences to form sentence meanings. This is the study of context-independent meaning—the meaning a sentence has regardless of the context in which it is used.

Natural language processing systems further comprise interpretation processes that map from one representation to the other. For instance, the process that maps a sentence to its syntactic structure and/or logical form is called parsing, and it is performed by a component called a parser. The parser uses knowledge about word and word meaning, the lexicon, and a set of rules defining the legal structures, the grammar, in order to assign a syntactic structure and a logical form to an input sentence.

Formally, a context-free grammar of a language is a four-tuple comprising nonterminal vocabularies, terminal vocabularies, a finite set of production rules, and a starting symbol for all productions. The nonterminal and terminal vocabularies are disjunctive. The set of terminal symbols is called the vocabulary of the language.

The typical natural language processor, however, has realized only limited success because these processors are complex and require that the creator of the processor have extensive knowledge about the natural languages to be translated as well as having proficiency in the programming language used to implement the processor. Furthermore, typical natural language processors are dedicated to translating between two specific languages and in one direction only, making them ineffective when both languages need to be translated simultaneously, and rendering them useless when a translation into a different language is required.

SUMMARY OF THE INVENTION

The above-mentioned shortcomings, disadvantages and problems are addressed by the present invention, which will be understood by reading and studying the following specification.

Language-neutral methods for syntactic analysis, transfer, and morphological and syntactical generation of feature structures are utilized by a natural language translation system to translation an input expression in a source language into an output expression in a target language. The language-neutral methods are driven by language-specific grammars to translate between the specified languages so that no knowledge about the languages need be incorporated into modules that implement the methods. The modules interface with the grammar rules in the form of compiled statements in a grammar programming language (GPL) that perform the required manipulation of the feature structures.

Because the module are language-neutral, the creator of the modules only need know how to access the compiled grammar rules; no in-depth knowledge of the GPL or the natural language is required. Similarly, the creator of the natural language grammar rules only has to be proficient in the GPL and understand one or both of the natural languages to be translated. Furthermore, because the methods and modules are language-neutral, the system is readily adaptable to new languages simply by providing a grammar for the new language. Additionally, because each module and a corresponding grammar for a particular language can be encapsulated, multiple instances of the same module for different languages can execute simultaneously in the system, enabling it to simultaneously translate multiple languages.

The present invention describes systems, computers, methods, and computer-readable media of varying scope. In addition to the aspects and advantages of the present invention described in this summary, further aspects and advantages of the invention will become apparent by reference to the drawings and by reading the detailed description that follows.

BRIEF DESCRIPTION OF THE DRAWINGS

FIGS. 2b, 2c, and 2d are diagrams of structures used by the embodiment of the natural language translation system shown in FIG. 2a;

FIG. 3 is a flowchart of one embodiment of a syntax analysis method suitable for use in the natural language translation system shown in FIG. 2a;

FIG. 4 is a flowchart of one embodiment of a transfer method suitable for use in the natural language translation system shown in FIG. 2a;

FIG. 5 is a flowchart of one embodiment of a syntactic generation method suitable for use in the natural language translation system shown in FIG. 2a;

FIG. 6 is a flowchart of one embodiment of an interface function method suitable for use in the natural language translation system shown in FIG. 2a; and FIG. 7 is a flowchart of one embodiment of a generate tree method suitable for use in the natural language translation system shown in FIG. 2a.

DETAILED DESCRIPTION OF THE INVENTION

Figure 1:
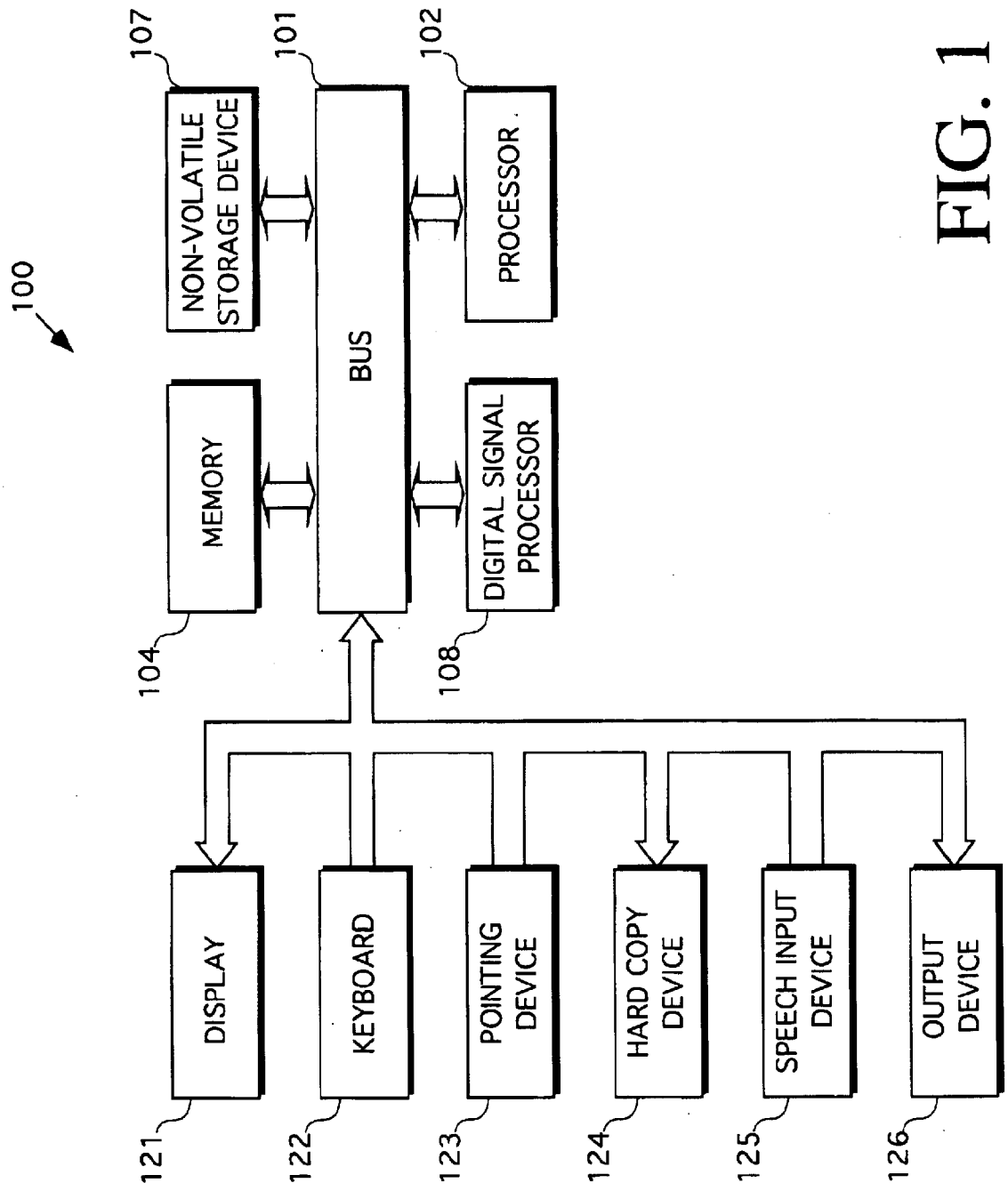
FIG. 1 is a block diagram of one embodiment of a computer hardware and operating environment suitable for practicing the present invention.

In the following detailed description of embodiments of the invention, reference is made to the accompanying drawings in which like references indicate similar elements, and in which is shown by way of illustration specific embodiments in which the invention may be practiced. Numerous specific details are set forth in order to provide a thorough understanding of the present invention. However, it will be apparent to one skilled in the art that the present invention may be practiced without these specific details. In some instances, well-known structures and devices are shown in block diagram form, rather than in detail, in order to avoid obscuring the present invention. These embodiments are described in sufficient detail to enable those skilled in the art to practice the invention, and it is to be understood that other embodiments may be utilized and that logical, mechanical, electrical and other changes may be made without departing from the scope of the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of acts leading to a desired result. The acts are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method. For example, any of the methods according to the present invention can be implemented in hard-wired circuitry, by programming a general purpose processor or by any combination of hardware and software. One of skill in the art will immediately appreciate that the invention can be practiced with computer system configurations other than those described below, including hand-held devices, multiprocessor systems, microprocessor-based or programmable consumer electronics, network PCs, minicomputers, mainframe computers, and the like. The invention can also be practiced in distributed computing environments where tasks are performed by remote processing devices that are linked through a communications network. The required structure for a variety of these systems will appear from the description below.

The methods of the invention are described in terms of computer software. If written in a programming language conforming to a recognized standard, sequences of instructions designed to implement the methods can be compiled for execution on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, application . . . ), as taking an action or causing a result. Such expressions are merely a shorthand way of saying that execution of the software by a computer causes the processor of the computer to perform an action or a produce a result.

FIG. 1 is a block diagram of one embodiment for an architecture of a computer system 100. Referring to FIG. 1, computer system 100 includes system bus 101 that allows for communication among processor 102, digital signal processor 108, memory 104, and non-volatile storage device 107. System bus 101 may also receive inputs from keyboard 122, pointing device 123, and speech signal input device 125. System bus 101 provides outputs to display device 121, hard copy device 124, and output device 126 (such as, for example, an audio speaker). Memory 104 may include, for example, read only memory (ROM), random access memory (RAM), flash memory, or any combination of the above.

It will be appreciated that computer system 100 may be controlled by operating system software which includes a file management system, such as, for example, a disk operating system, which is part of the operating system software. The file management system may be stored in non-volatile storage device 107 and may be configured to cause processor 102 to execute the various functions required by the operating system to input and output data and to store data in memory 104 and on non-volatile storage device 107.

Figure 2A:
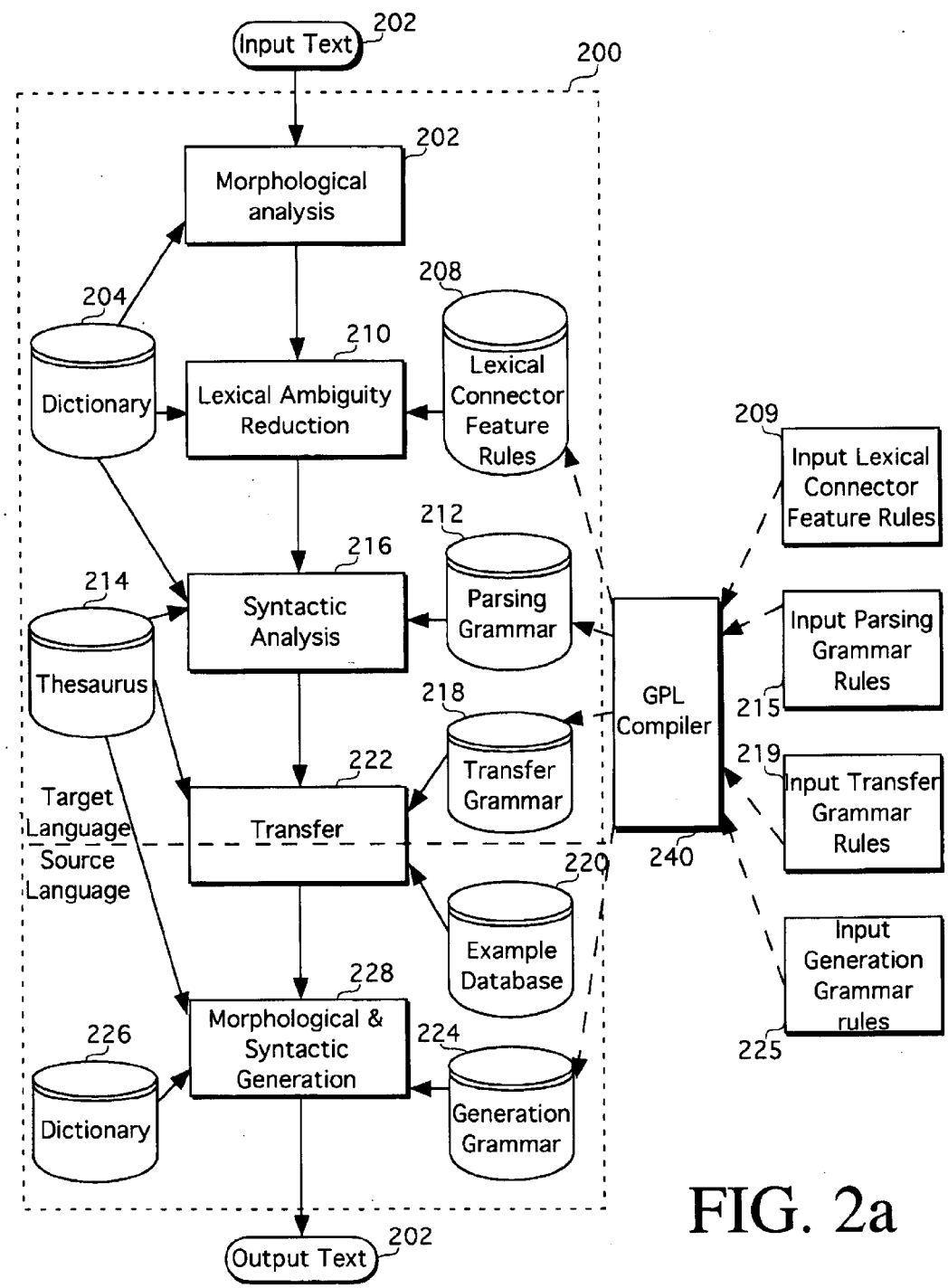
FIG. 2a is a block diagram of one embodiment of a natural language translation system that operates in the environment shown in FIG. 1.

FIG. 2a is a block diagram of one embodiment for a natural language translation system 200. Referring to FIG. 2a, natural language translation system 200 includes five modules, supporting databases, and associated grammars to quickly and accurately translate text between source and target languages. Input text may be directly input into natural language translation system 200 (for example, as with a person typing sentences into a computer using keyboard 122). Alternatively, input text to natural language translation system 200 may be the output of another system, such as, for example, output from a speech recognition system (for example, speech input device 125), or from an optical character recognition system (not shown).

An English sentence "He wants to go to the White House" is used throughout this section as example text input to describe the functioning of the system 200. The individual units in a sentence are referred to herein as "words" but the natural language translation system 200 is not limited to only word-based natural languages, having equal applicability to translation of character-based languages as well. Except where the differences in processing word-based and character-based languages are specified, the term "word" is intended to encompass both words and characters.

In the following description, a grammar is generally a set of context-free rules that define the valid phrase structures in the source or target language, with each context-free rule associated with one or more statements (the "rule body") that perform tests and manipulations on the linguistic representations (feature structures). Thus, an English sentence may be combined from a noun phase (NP) and a verb phrase (VP), but the subject and verb forms must agree, e.g., "He want to go to the White House" is a valid phrase structure but an improper English sentence. All rule bodies utilized by the grammars of language translation system 200 are in the form of computer-executable routines produced by defining the grammar in terms of a grammar programming language (GPL) and passing appropriate rule bodies (209, 215, 219, and 225) through a GPL compiler 240. The output of the GPL compiler 240 may be in the form of directly executable code, or may be in the form of standard computer programming language statements (such as, for example, C, C++, Pascal, or Lisp) which are then input into the corresponding programming language compiler to produce executable code. In either case, the compiled grammars include a specific function for each context-free rule. The specific function performs all the processing required by the rule and its associated rule body. Furthermore, the interfaces between the compiled grammars and the modules enable a single language translation system 200 to perform translation between multiple natural languages, and to perform more than one translation simultaneously.

A morphological analysis module 206 takes text input 202 and uses a source language dictionary 204 to decompose the words into morphemes by identifying root forms, grammatical categories, thesaurus information, and other lexical features of the words. The morphological analysis module 206 builds a "feature structure" for each word. Feature structures are well known in the art as linguistic data structures that contain feature-value pairs for strings, symbols, and numbers that appear in a natural language sentence. Each feature of a word is mapped to the appropriate value through a function commonly designated as:

$$word \mapsto [feature:value]$$

Thus, a simplified, exemplary representation of the feature structures for the words "he" and "wants" are as follows:

$$(\text{Feature Structure 1}) \quad l \mapsto \begin{bmatrix} root: he \\ cat: pronoun \end{bmatrix}$$

$$(\text{Feature Structure 2}) \quad wants \mapsto \begin{bmatrix} \begin{bmatrix} root: want \\ cat: noun \end{bmatrix} \\ OR \\ \begin{bmatrix} root: want \\ cat: verb \end{bmatrix} \end{bmatrix}$$

The Feature Structure 2 may be referred to as a "disjunctive" feature structure as it represents two mutually exclusive feature structures that are valid for the word.

It will be appreciated that the grammatical category is not the only feature of these two words and that morphological analysis module 206 outputs full feature structures. The example feature structures are simplified for the sake of clarity in explanation and are also frequently represented by a shorthand notation, e.g., [want] or NP[].

The feature structures built by morphological analysis module 206 are input into lexical ambiguity reduction module 210. In one embodiment, lexical ambiguity reduction module 210 may segment the words in character-based languages that do not utilize spaces through a database of lexical connector feature rules 208. Lexical connector feature rules 208 are created from GPL grammar statements as described above. Each possible combination of adjacent segmented words are assigned a lexical cost. Dictionary 204 defines combinations of words ("multiwords"). Lexical ambiguity reduction module 210 evaluates each feature structures that contains a part-of-speech (POS) ambiguity, such as the feature structure for the word "wants" which is tagged as both a noun and a verb. The various possible POS tags are assigned a lexical cost. Lexical ambiguity reduction module 210 weighs the cost assigned to each word in the sentence and selects those feature structures that have the lowest cost.

Figure 2B:
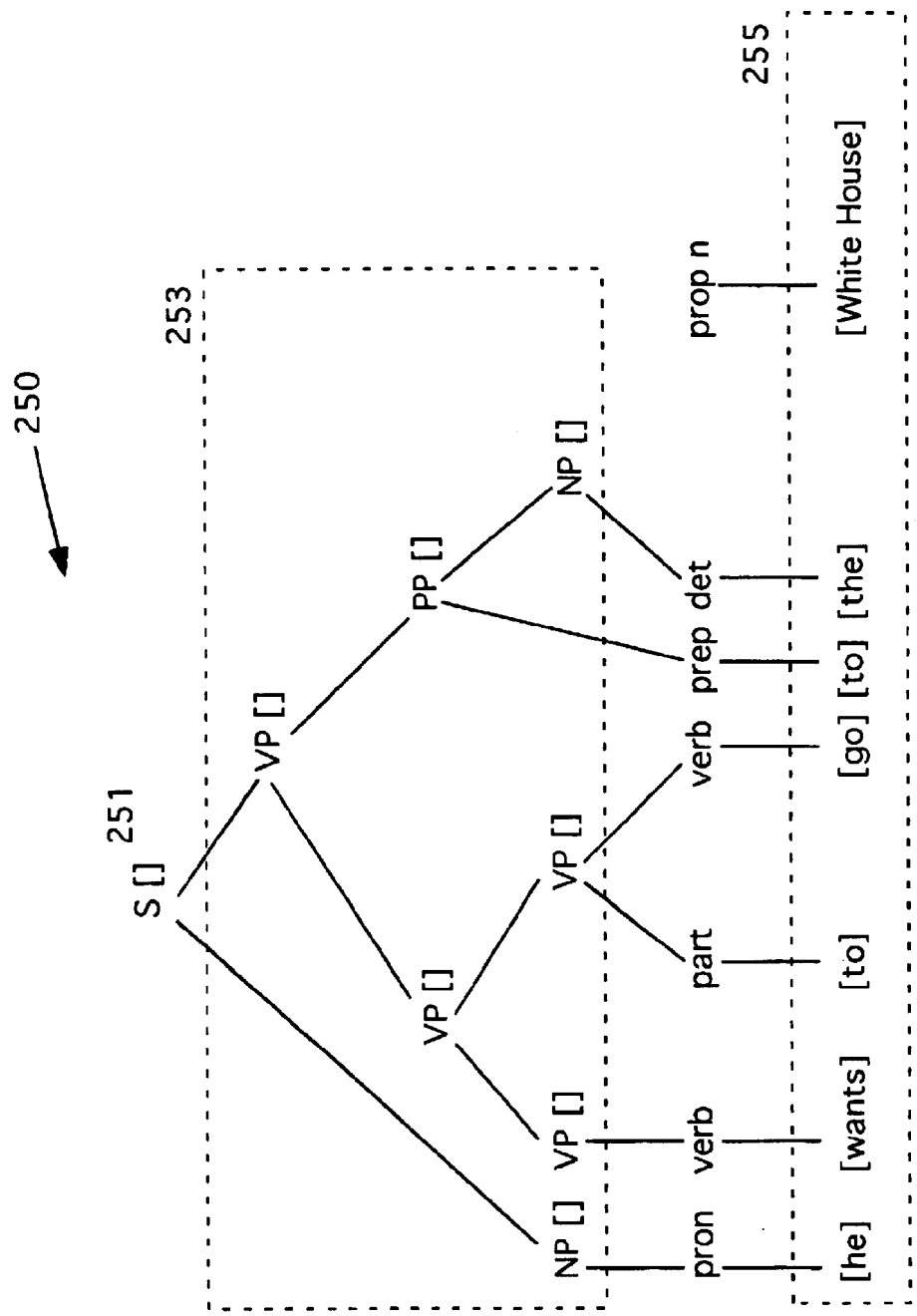

The feature structures chosen for the words by lexical ambiguity reduction module 210 are passed to syntactic analysis module 216. Syntactic analysis module 216 combines the chosen feature structures into a feature structure that represents the content of the input sentence. In one embodiment, syntactic analysis module 216 uses parsing grammar 212 to create a syntax parse tree for the sentence. Parsing grammar 212 contains the source language context-free grammar rules in the form of a parsing table and the associated rule bodies in executable code. Each leaf of the syntax parse tree is a feature structure for one of the words in the sentence. Once the leaves are created, an intermediate feature structure for each branch (parent) node in the syntax parse tree is built by combining its child nodes as specified in one or more of the context-free grammar rules. The rule body for each potentially applicable context-free grammar rule manipulates the various feature structures at the child nodes and determines whether the associated context-free rule could create a valid phrase from the possible combinations. A rule body may cause a thesaurus 214 to be queried as part of the manipulation. It will be appreciated that the feature structure that results from applying the context-free grammar rules may be nested (i.e., contain multiple feature structures from each child node). Syntactic analysis module 216 may create the syntax parse tree shown in FIG. 2b for the example sentence from its constituent feature structures, with the following feature structure at the top (root) of the syntax parse tree to represent the full sentence:

(Feature Structure 3) $S \rightarrow \begin{bmatrix} \text{SUBJ "he"} \\ \text{VERB "wants to go"} \\ \text{OBJ "to the White House"} \end{bmatrix}$ It will be appreciated that both the syntax parse tree 250 and the Feature Structure 3 are not exact representations but are simplified for purposes of ease in explanation.

The feature structure for the sentence in the source language is passed to transfer module 222. The feature structure represents the analysis of the source input and may contain a number of nested linguistic representations (referred herein as sub-structures or slots). Transfer module 222 uses transfer grammar 218 to match source language slots of the input with source language slots in example database 220. Example database 220 contains feature structure pairs in the source language and a target language. For example, database 220 may contain matching feature structures in English and Japanese. Transfer grammar 218 consists of a set of rewrite rules with a context-free component and a GPL rule body. The context-free parts of the rules are used to create a transfer generation tree.

Figure 2C:
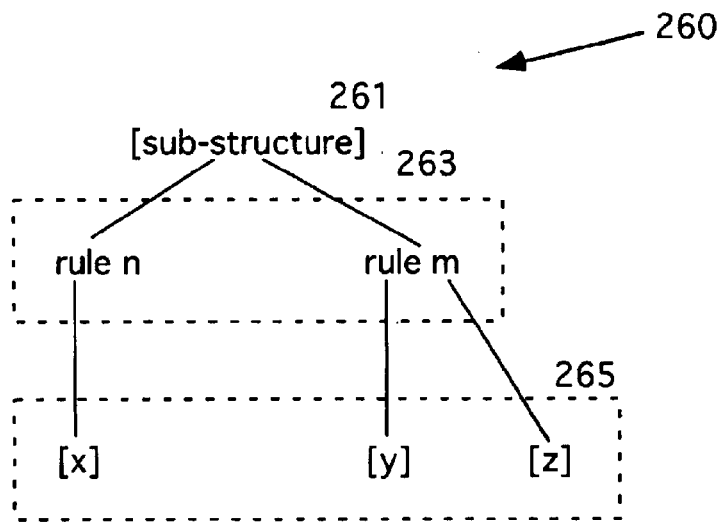

Transfer module 222 uses the GPL rule bodies within transfer grammar 218 to match the input source sub-structures or slots to the source sub-structures or slots in example database 220. If a good match is found (in one embodiment, a low overall match cost), transfer module 222 checks if all sub-structures or slots of the input feature structure have found a match. If a match for a sub-structure is not found, the sub-structure is used as input to transfer module 222. A transfer generation tree of the form shown in FIG. 2c is used to break the sub-structure into multiple sub-structures. The new input may be a part of the original, source feature structure or a new feature sub-structure that is constructed from sections of different slots.

Transfer module 222 uses the input feature structure (or sub-structure) in the source language as the starting symbol to build transfer generation tree 260. Root 261 is a symbol-node (s-node) and is labeled with the starting symbol of the feature structure. The transfer grammar determines which transfer grammar rules are applicable to the feature structure at the root 261, and creates child rule-node(s) (r-node) 263 depending from root 261. In one embodiment, r-nodes 263 are the rule numbers within transfer grammar 218 that may be validly applied to the input feature structure. Transfer grammar 218 rules added to tree 260 are applied to the s-nodes 265. If the application of each rule succeeds, a child rule-node (r-node) 265 is added to tree 260. If the application fails, the s-node 261 is tagged as "dead" for sub-sequent removal. Transfer grammar 218 then creates a new s-node 265 for each r-node 263. Again, the applicable rules are found for each s-node 265 and applied. The process is repeated until all sub-features within the feature structure have been expanded. Transfer generation tree 260 is then pruned to remove any "dead" nodes and corresponding sub-trees. If root 261 is tagged as "dead," the generation fails. Otherwise, the resulting transfer generation tree 260 is used by transfer module 222 to match the feature structure against the example database 220. The feature structures and sub-structures in the target language associated with a match are substituted for the corresponding feature structures and sub-structures matched in the source language. Transfer module 222 recursively applies the transfer rules contained within transfer grammar 218 from the top-most transfer rules until all meaningful sub-features or constituents within the input source feature structure are transferred to the target sub-structures. The transfer module 222 will consult the thesaurus 214 when required to do so by a transfer rule. Transfer module 222 outputs a feature structure in the target language.

Figure 2D:
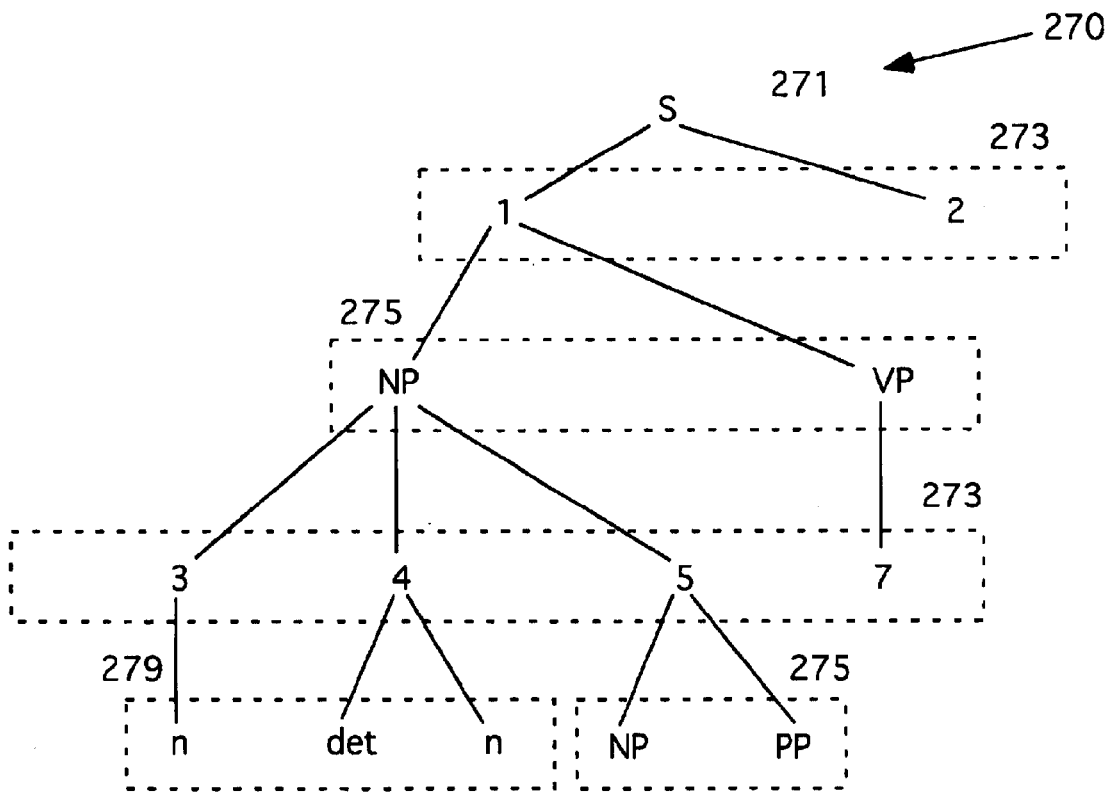

The feature structure for the sentence in the target language is passed to a morphological and syntactical generation module 228, where it is used as the root node for a syntactical generation tree, an example of which is shown in FIG. 2d. The syntactical generation tree is built in the same fashion as the transfer generation tree, with context-free rules in a generation grammar 224 as its r-nodes 273. The generation grammar 224 copies information to each s-node 275, 279. Unlike the transfer module 226, in which multiple sub-transfers created multiple transfer generation trees, only one syntactical generation tree is created by the morphological and syntactical generation module 228. Any s-node that is not a leaf node 279, i.e., associated with a feature structure for a word, is used to generate the next level of r-nodes. When all child s-nodes under an r-node are leaf nodes, the current branch of the tree is complete and the morphological and syntactical generation module 228 traverses back up the tree to find the next s-node that is not a leaf node. The thesaurus 214 is consulted when necessary during the generation of the tree. The transfer generation tree is complete when all the lowest level s-node are leaf nodes.

When the syntactical generation tree is complete, the leaf nodes contain output feature structures representing the words in one or more translations of the input sentence. The sequence of output feature structures that represents the best sentence is converted into output text 230 by the morphological and syntactical generation module 228 using the dictionary 226. Alternatively, all output feature structures for all sentences may be converted into the output text 230.

The syntactic analysis module 215, transfer module 222, and morphological and syntactical generation module 228 are language-neutral in that they are driven by language-specific grammars to translate between the specified languages so that no knowledge about the languages need be incorporated into the modules themselves. Similarly, no knowledge about the functioning of the modules is required in the natural language grammar rules.

A system level overview of the operation of an embodiment of the natural language translation system has been described above. The natural language translation system utilizes various modules, grammars and databases to translate between multiple languages simultaneously. While the invention is not limited to any particular arrangement of modules, grammars and database, for sake of clarity a single configuration has been illustrated and described.

The particular methods performed by a computer executing such embodiments for the syntactic analysis module 215, transfer module 222, and morphological and syntactical generation module 228 of FIG. 2a are described next by reference to a series of flowcharts. The methods to be performed constitute computer programs made up of computer-executable instructions. Describing the methods by reference to a flowchart enables one skilled in the art to develop such programs including such instructions to carry out the methods on suitable computers (the processor of the computer executing the instructions from computer-readable media). The methods are frequently described below as taking an action or causing a result. One of skill in the art will immediately understand that it is the execution of the instructions for the method that causes the processor to perform the action or produce the result.

Figure 3:
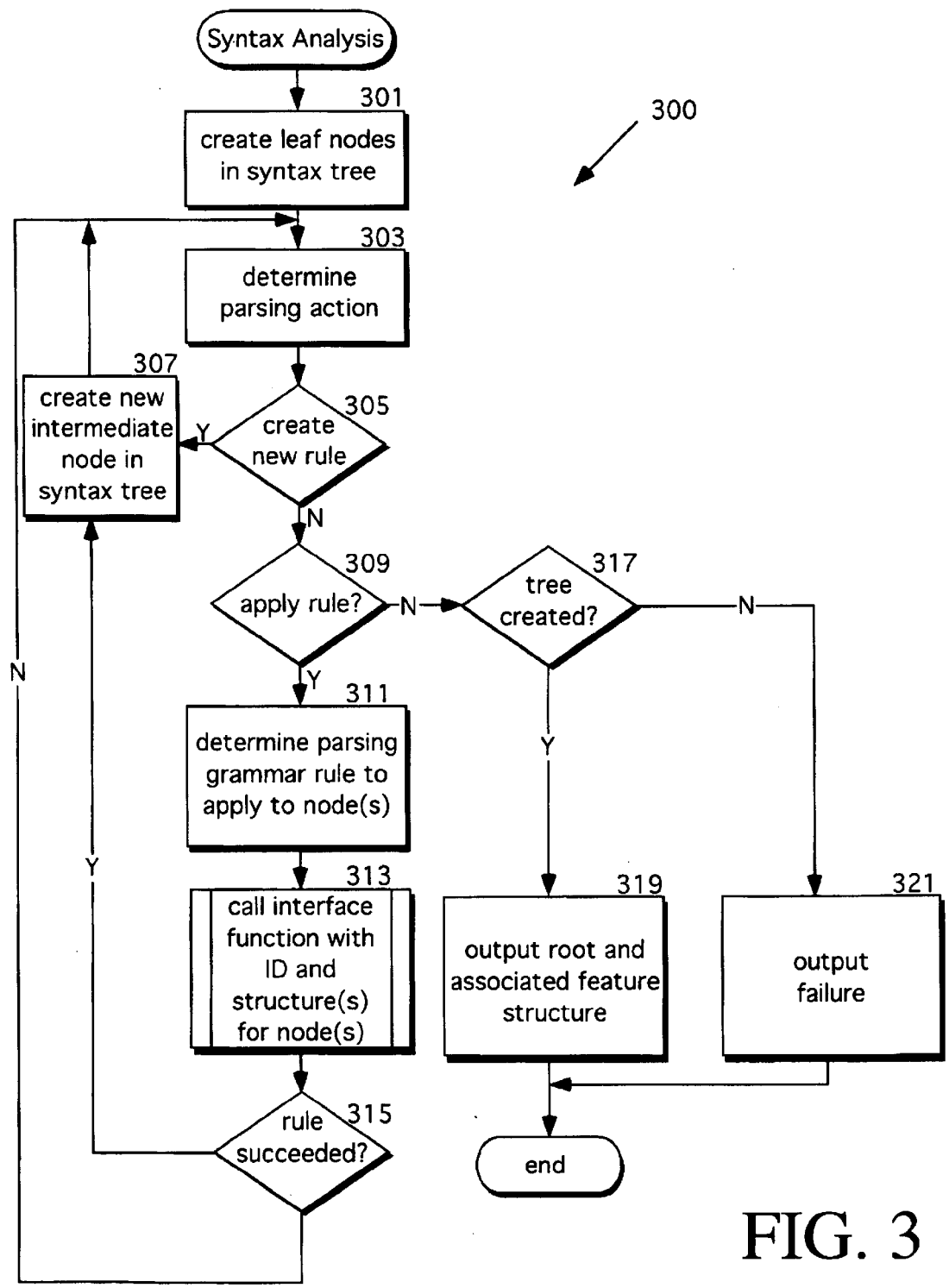
Figure 4:
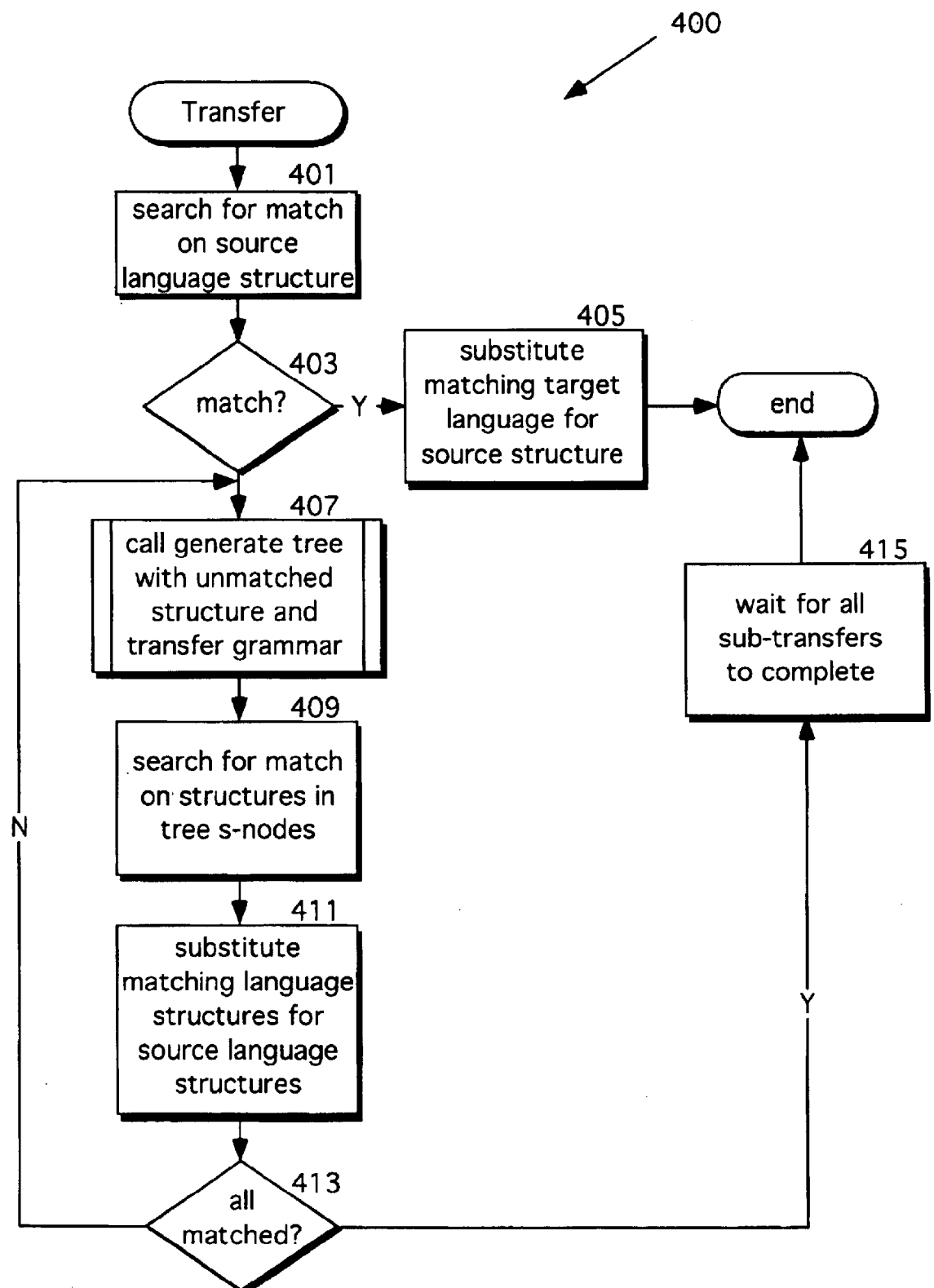
Figure 5:
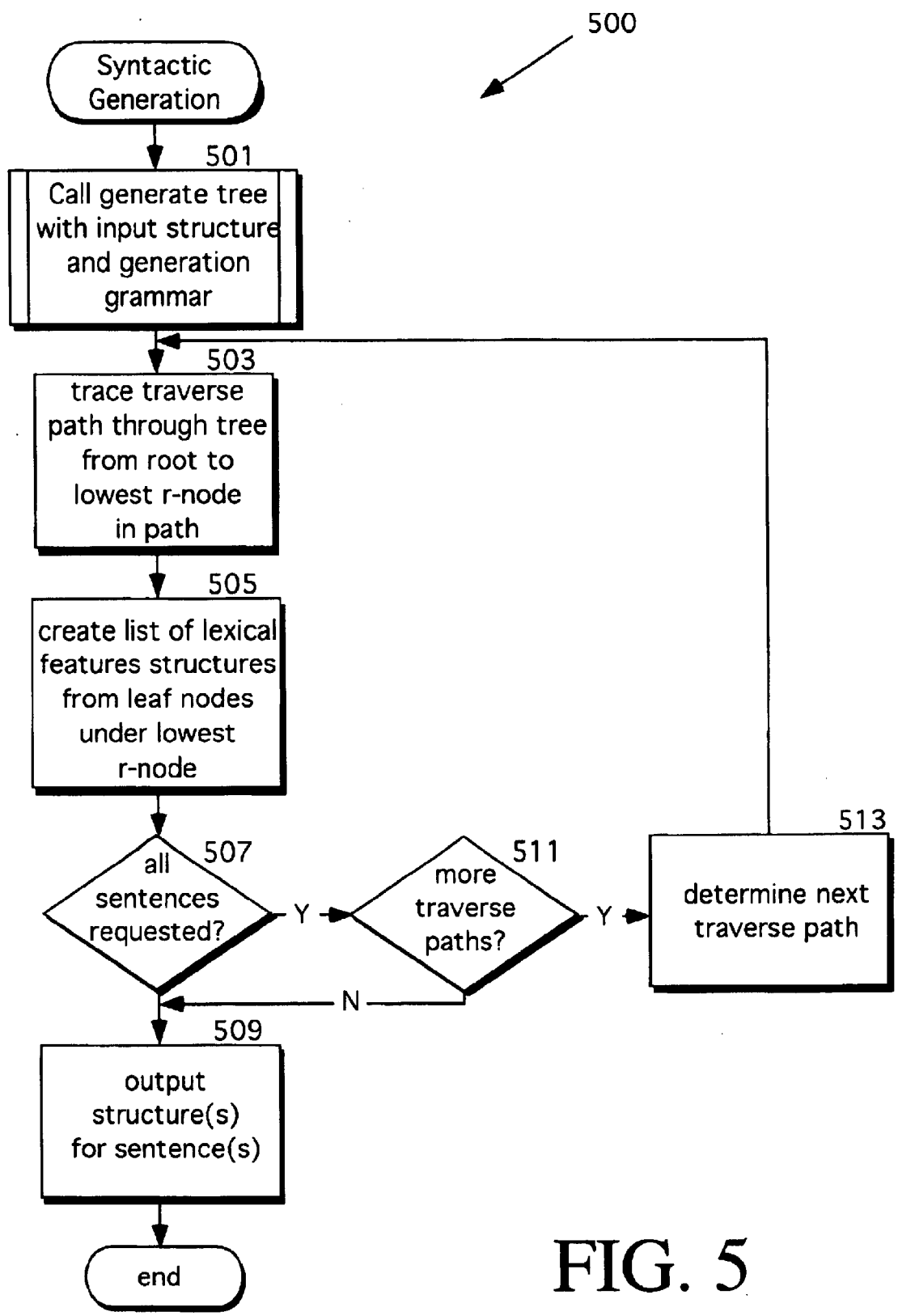

FIGS. 3, 4 and 5 illustrate embodiments of methods that can be used to implement the syntactic analysis module 215, transfer module 222, and morphological and syntactical generation module 228, respectively. The grammars used by the methods are compiled as described above to create an indexed data structure containing the context-free portion of each grammar rule and an executable function that represents the associated rule body. It will be appreciated that any GPL compiler that processes GPL statements into a compiled grammar having the above-stated characteristics is suitable for use with the invention.

Figure 6:
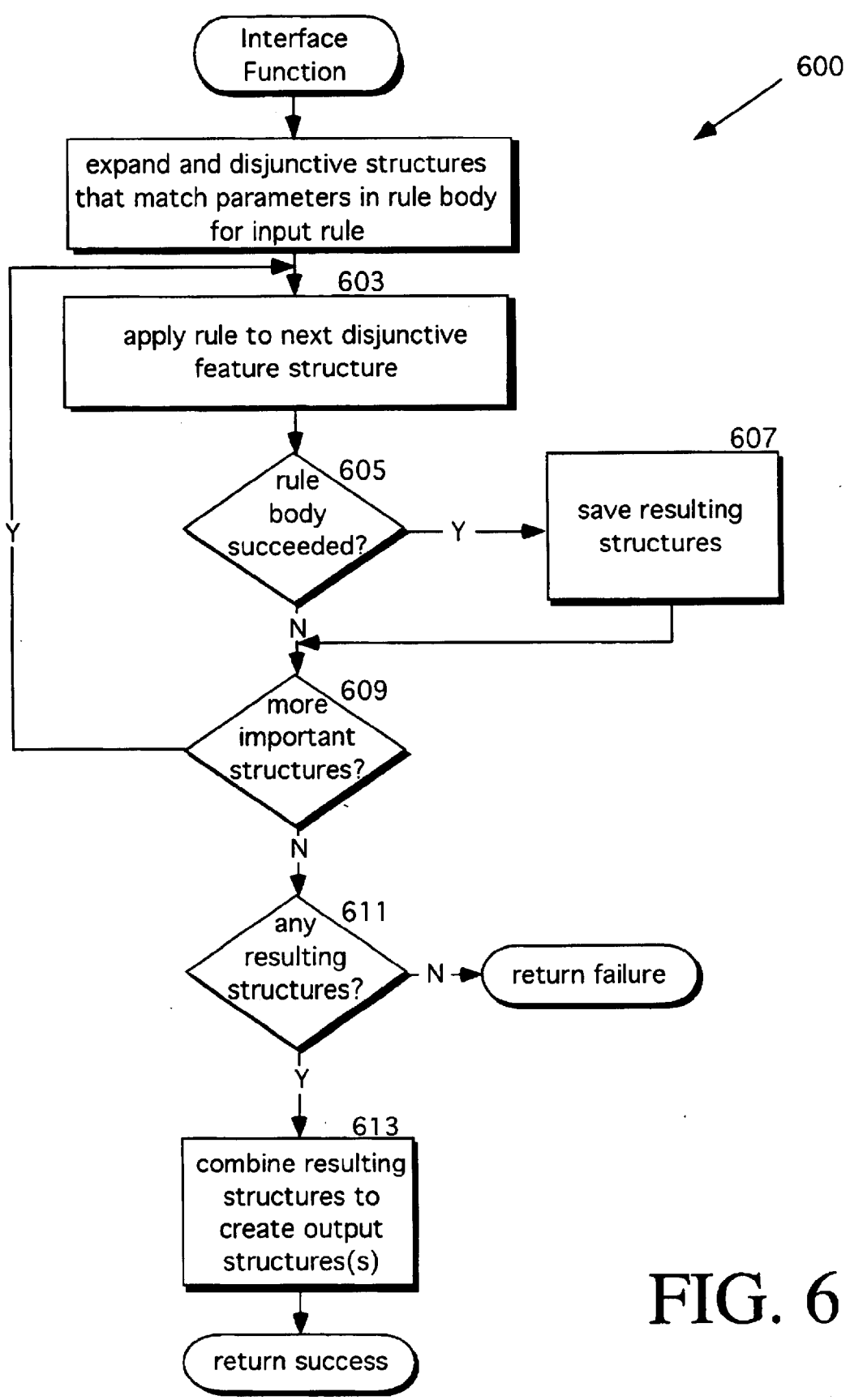

In the embodiments described below, the methods in FIGS. 3, 4 and 5 call an interface function created by the GPL compiler to apply grammar rules against specified feature structures. The use of such an interface function enables the methods in FIGS. 3, 4 and 5 to be language-neutral and, thus, able to translate new languages by merely providing the appropriate grammars. One embodiment of method for such an interface function is shown in FIG. 6 and described further below. Additionally, the embodiments of the transfer method (FIG. 4) and the syntactical generation method (FIG. 5) are described below as employing the same method to generate their respective trees. One embodiment for tree generation method suitable for use by both the transfer and syntactical generation methods is described in conjunction with FIG. 7. It will be appreciated that the utilization of different tree generation methods by the transfer and syntactical generation methods is also within the scope of the invention.

Although the methods of FIGS. 3-7 are not described in object-oriented terms and the methods are not required to be implemented in an object-oriented computer programming language, it will be readily understood by one of skill in the art that implementing the methods in an object-oriented computer programming language provides many advantages. For example, a different instance of the methods can be invoked for each language to be translated, thus enabling a single natural language translation system to support simultaneous translation in multiple languages.

Referring first to FIG. 3, the acts to be performed by a computer executing one embodiment of a syntax analysis method are shown. The method 300 relies on a conventional parsing method to build the nodes in a syntax parse tree, such as the example syntax parse tree shown in FIG. 2b. One of skill in the art will immediately recognize that any parsing method that builds a parse tree from the leaf nodes to the root node is applicable to the present invention upon reading the following description. Similarly, it will be appreciated that other parsing data structures can be substituted for the parse tree of without exceeding the scope of the invention. The method 300 uses a parsing grammar (such as the parsing grammar 212 of FIG. 2a), that consists of a parsing table for the context-free rules and executable functions for the associated rule bodies, to determine what feature structures to associate with the various tree nodes.

The feature structures output by the lexical ambiguity reduction module 210 for the words in the source language sentence (or expression) are used to create the leaf nodes of the syntax parse tree (block 301). When all leaf nodes are created, the method 300 builds the intermediate nodes above the leaf nodes as determined by parsing actions in the parsing table representing the context-free rules (block 303). One of skill in the art will immediately recognize that the method 300 is not limited to use with a parsing table, and that other data structures are equally applicable. Furthermore, it will be appreciated that the leaf nodes can be created by parsing symbols representing the input feature structures as described next for intermediate nodes.

The current parsing action can specify the creation of a new node (block 305 and 307), or that a parsing grammar rule should be applied against one or more nodes in the tree (block 309 and 311). In one embodiment, the parsing action at block 305 is termed "shift" and the action at block 309 is termed "reduce." In one embodiment of block 311, the parsing grammar rules are indexed based on non-terminal symbols, such as NP or VP, and the rule is determined by searching for a rule that matches the non-terminal symbols at the nodes.

The feature structure(s) corresponding to the node(s) and an identifier for the appropriate parsing grammar rule are input into an interface function method (block 313). As described in more detail below in conjunction with FIG. 6, the interface function examines the rule body associated with the rule to determine if the rule can be applied to the input feature structure(s). If the rule is successfully applied (block 315), the interface function returns a new feature structure, which is associated with a new node (block 307). If the rule was not successful, no node is created and a new parsing action is determined.

The method 300 continues to apply rules and create nodes until the current parsing action specifies that the syntax analysis is complete (block 317). If a syntax tree was created as a result of the analysis, the feature structure associated with the root node is output (block 319) to represent the source language sentence. Otherwise, the a failure indication is output (block 321). In one embodiment, the parsing action that specifies that the syntax analysis is complete is termed "accept."

Assuming a feature structure is output by the syntax analysis method 300, it is passed into a transfer method illustrated in FIG. 4. The embodiment of the transfer method 400 is suitable for implementing the transfer module 222 in FIG. 2a. It utilizes a transfer grammar, an example database, and a thesaurus having the characteristics described for the corresponding components in FIG. 2a.

The transfer method 400 first attempts to match the feature structure for the entire sentence against the bilingual examples in the example database (block 401). If a match is found (block 403), the feature structure for the corresponding target language sentence (or expression) is output (block 405).

Figure 7:
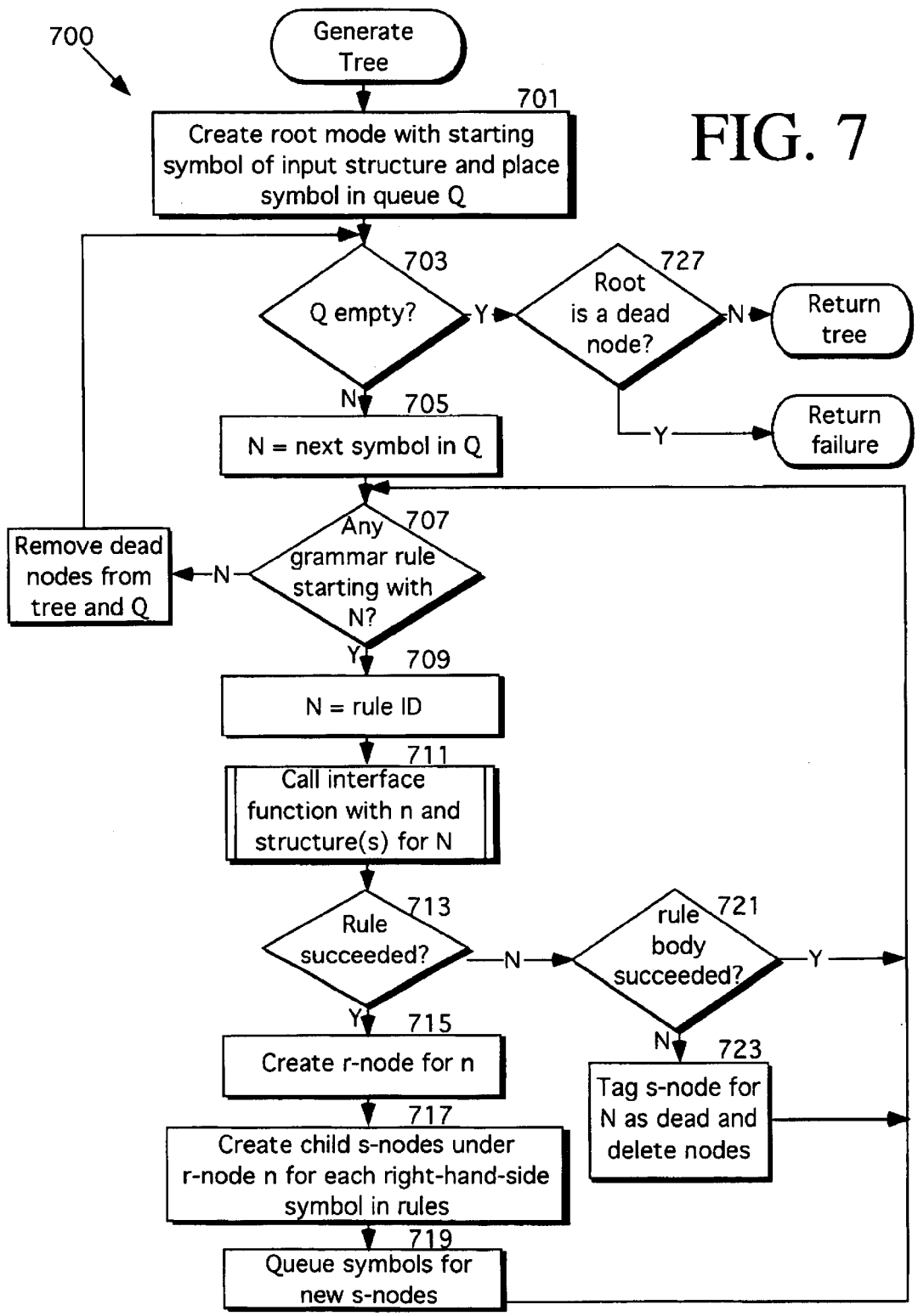

If no match is found, the method 400 calls a generate tree method to break the feature structure into sub-structures (block 407) in accordance with the transfer grammar rules. The generate tree method creates a transfer generation tree with the sub-structures in the lowest level s-nodes, as previously described in conjunction with FIG. 2c. The generation tree method is illustrated in FIG. 7 and described in detail further below. A match is attempted on each of the sub-structures (block 409) and the appropriate substitutions made for matches (block 411). If all the sub-structures are matched (block 413), the method 400 waits for all sub-transfers (as described next) to complete (block 415).

If there are still unmatched feature structures, each is processed as a sub-transfer by performing blocks 413 until 413. It will be appreciated that a sub-transfer can invoke yet another sub-transfer so that the transfer method 400 recursively calls itself until all feature structures in the source language have been replaced with corresponding feature structures in the target language. A nested feature structure representing the sentence in the target language is output when all sub-transfers are complete. The target language feature structure is used as input to a syntactic generation method illustrated in FIG. 5 and described next.

The syntactic generation method 500 forms the syntactic portion of the morphological and syntactic generation module 228 in FIG. 2a. In one embodiment, the syntactic generation method 500 creates a list of feature structures that represents the words in the best translation of the input sentence in the target language. In another embodiment, the method 500 creates several lists of feature structures for several different translations. The syntactic generation method 500 calls the generate tree method (block 501) described briefly above and in more detail below, passing in the target language feature structure that was input to the method 500, along with a generation grammar. The generation grammar has similar characteristics to that described in conjunction with the generation grammar 224 in FIG. 2a.

The generate tree method at block 501 returns a syntactical generation tree of the form illustrated in FIG. 2d, with features structures for words in the sentence as leaf nodes. The method 500 traces through the syntactical generation tree as determined by a traverse path to select leaf nodes (block 503) from which to create a list of feature structures for the words in the sentence (block 505). One embodiment of the traverse path specifies that the branch represented by the left-most r-node under an s-node is always followed and that all s-nodes on each such branch are further traversed in the same fashion until all the leaf nodes in the traverse path have been reached. All the leaf nodes in the path are selected to build the list of lexical feature structures.

If all the sentences in the input feature structure are requested to be output (block 507), the method 500 determines if all paths through the syntactical generation tree have been traced (block 511). If not, another traverse path is chosen (block 513) to create a list of feature structures for the words in another translation of the sentence. If all paths have been traced, or if less than all the translations have been requested, the resulting feature structure(s) are output (block 509).

Turning now to FIG. 6, the interface method referred to above is described. The particular acts performed by interface method 600 are determined by the grammar rule that is input to it. The interface method 600 performs an expansion function to expand only those disjunctive feature structures in the input feature structure(s) that have a feature referred to in the rule body for the input rule (block 601). The rule body is applied to each disjunctive feature structure that was expanded (block 603) and must be satisfied by an expanded feature structure in order to execute the context-free rule to create a new feature structure. If the rule body succeeds (block 605), the resulting feature structures are saved for later processing (block 607).

Once all the input (and expanded) feature structures have been evaluated against the grammar rule (block 609), the method 600 determines if there are any resulting feature structures (block 611). If not, no input (or expanded) feature structure satisfied the rule body and the grammar rule fails. Any resulting feature structures are combined into output feature structure(s) that represent the successful application of the grammar rule (block 613).

It will be readily apparent to one skilled in the art that the interface function method 600 can take as input a feature structure that represents the left-hand side of a context-free grammar rule and output multiple feature structures that represent the right-hand side of the grammar rule, or the reverse. Alternate embodiments in which a separate interface function method is employed to process in each direction is within the scope of the invention.

The generation tree method referred to previously is now described with reference to FIG. 7. The generation tree method 700 is used to generate both transfer generation trees and syntactical generation trees. In both cases, the root node of the tree is created with the starting symbol of the feature structure that is passed to the method 700 (block 701). The starting symbol is also queued. Because the starting symbol is the only symbol in the queue (block 703), it becomes the current symbol (block 705) and is used to search for a grammar rule starting with the same symbol (block 707). A matching rule and the feature structure for the current symbol is input into the interface function method 600 previously described (block 711). If the grammar rule succeeded (block 713), the method 700 creates an r-node in the generation tree for the rule (block 715) and child s-nodes under the r-node for each symbol on the right-hand side of the grammar rule (block 717). The symbol at each child s-node is the starting symbol for a feature structure created by the application of the grammar rule in the interface function method 600. The symbols at the child s-nodes are placed in the queue to be processed recursively (block 719). In one embodiment, special symbols are created by the grammar rules to indicate to the method 700 that the lowest desired level of the corresponding branch of the tree has been generated.

If the current grammar rule fails but there are other rules that can be applied against the current that may result in child nodes (block 721), the method 700 loops to apply the next rule for the current symbol. If there are no possible child nodes, the s-node for the current symbol is tagged as a "dead" node (block 723). Any r-nodes that have been created and have dead children nodes are deleted from the tree at block 723. Once all grammar rules starting with the current symbol are processed by the interface function method and appropriate r-nodes and s-nodes created, all dead nodes in the tree are deleted (block 725) and the next symbol in the queue is processed. If the queue is empty (block 703), the tree is completed and the method 700 determines if the root node is tagged as dead (block 727). A dead root node means that no children r-nodes exist and the method 700 has failed to create any new feature structures. Otherwise, the generation tree is returned.

The particular methods performed by a computer for exemplary embodiments of the syntactic analysis module 215, transfer module 222, and morphological and syntactical generation module 228 for a natural language translation system have been described. The methods have been shown by reference to a series of flowchart including all the acts from 301 until 321, from 401 until 415, from 501 until 513, from 601 until 613, and from 701 until 727.

A natural language translation system built from various language-neutral modules and the corresponding methods have been described. The language-neutral modules/methods are driven by language-specific grammars to translate between the specified languages, allowing the same translation system to be used for multiple languages. Implementation of the modules and grammar for a specific language as encapsulated objects also enables simultaneous translation of multiple languages. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention.

The terminology used in this application with respect to the operating and computer programming environments is meant to include all environments that provide the features required to implement the natural language translation system. Therefore, it is manifestly intended that this invention be limited only by the following claims and equivalents thereof.

What is claimed is:

1. A method for translating an expression from a source natural language into a target natural language using compiled grammars generated from grammar rules compiled by a grammar programming language compiler, the method comprising:

providing the compiled grammars comprising a compiled parsing grammar, a compiled transfer grammar and a compiled generation grammar; and manipulating a representation of the expression as directed by the compiled grammars to translate the expression from the source natural language into the target natural language, wherein manipulating the representation comprises:

building a syntax parsing data structure for the expression as directed by the compiled parsing grammar, the syntax parsing data structure containing a source natural language feature structure for the expression;

creating a target natural language feature structure for the expression from the source natural language feature structure for the expression as directed by the compiled transfer grammar; and building a syntactic generation data structure from the target natural language feature structure as directed by the compiled generation grammar, the syntactic generation data structure representing at least one valid translation of the expression.

2. The method of claim 1, wherein the syntax parsing data structure is built from a plurality of feature structures, each representing a word in the expression in the source natural language.

3. The method of claim 1, wherein creating the target natural language feature structure comprises matching the source natural language feature structure against set of bilingual example feature structures and substituting any portion of the source natural language feature structure that is matched.

4. The method of claim 1, wherein creating the target natural language feature structure comprises building a transfer generation data structure from the source natural language feature structure.

5. The method of claim 4, wherein the transfer generation data structure comprises a plurality of sub-transfer generation data structures and building the transfer generation data structure comprises invoking a plurality of sub-transfer processes, each sub-transfer process responsible for building a sub-transfer generation data structure.

6. The method of claim 1, wherein building the syntax parsing data structure comprises:

creating nodes in the syntax data structure by applying a set of rules in the compiled parsing grammar as directed by a series of parsing actions, each node associated with a feature structure representing at least a portion of the expression and any feature structure created at a root node of the syntax data structure representing the expression.

7. The method of claim 6, wherein the parsing actions in the series are selected from a parsing table associated with the compiled parsing grammar for the natural language.

8. The method of claim 6, wherein the rules in the set are determined based on the feature structures associated with the nodes.

9. The method of claim 1, wherein creating the target natural language feature structure comprises:

substituting a target natural language feature structure representing the expression for a source natural language feature structure representing the expression when the source natural language feature structure matches a bilingual example feature structure;

applying a set of compiled transfer grammar rules to the source language feature structure to build a transfer generation data structure having a plurality of source language feature sub-structures representing portions of the expression;

substituting a target natural language feature sub-structure representing a portion of the expression for a source natural language feature sub-structure representing the portion when the source natural language feature sub-structure matches a bilingual example feature structure; and separately applying a specific set of compiled transfer grammar rules to each source natural language feature sub-structure that does not match a bilingual feature structure to build a plurality of transfer generation data structures to create new source natural language feature sub-structures until a target natural language feature sub-structure has been substituted for each source natural language feature sub-structure.

10. The method of claim 9, wherein creating the target natural language feature structure further comprises:

determining the specific set of compiled transfer grammar rules to apply based on each source natural language feature sub-structure that does not match a bilingual feature structure.

11. The method of claim 9, wherein the transfer generation data structure comprises:

a root node associated with a first source language feature sub-structure, the first source language feature sub-structure representing a portion of the expression;

at least one rule node below the root node, the at least one rule node being associated with one rule from the specific set of compiled transfer grammar rules; and at least one symbol node below the at least one rule node, the at least one symbol node being associated with a source language feature sub-structure for a part of the portion.

12. The method of claim 1, wherein building the syntactic generation data structure comprises:

applying a set of compiled generation grammar rules to build a syntactic generation data structure from a feature structure representing at least one version of the expression; and choosing a list of feature structures associated with leaf nodes in the syntactic generation data structure to represent the expression.

13. The method of claim 12, wherein applying the set of compiled generation grammar rules comprises:

repeatedly applying a specific set of compiled generation grammar rules to a feature structure associated with a symbol node to create a level of rule nodes below the symbol node, each rule node associated with a rule satisfied by the feature structure; and repeatedly applying the rule associated with a rule node to the symbol node above the rule node to create a level of symbol nodes below the rule node, each symbol node associated with a feature structure created by applying the rule, until the features structures associated with the symbol nodes represent words in the expression.

14. The method of claim 12, wherein choosing the list of feature structures comprises tracing a traverse path through the data structure until all leaf nodes on the traverse path have been reached.

15. The method of claim 12, wherein choosing the list of feature structures results in a single version of the expression.

16. The method of claim 12, wherein choosing the list of feature structures results in multiple versions of the expression.

17. A computer-readable medium having stored thereon executable instructions to cause a computer to perform a method for translating an expression from a source natural language into a target natural language using compiled grammars generated from grammar rules compiled by a grammar programming language compiler, the method comprising:

providing the compiled grammars comprising a compiled parsing grammar, a compiled transfer grammar and a compiled generation grammar; and manipulating a representation of the expression as directed by the compiled grammar to translate the expression from the source natural language into the target natural language, wherein manipulating the representation comprises:

building a syntax parsing data structure for the expression as directed by the compiled parsing grammar, the syntax parsing data structure containing a source natural language feature structure for the expression;

creating a target natural language feature structure for the expression from the source natural language feature structure for the expression as directed by the compiled transfer grammar; and building a syntactic generation data structure from the target natural language feature structure as directed by the compiled generation grammar, the syntactic generation data structure representing at least one valid translation of the expression.

18. The computer-readable medium of claim 17, wherein the syntax parsing data structure is built from a plurality of feature structures, each representing a word in the expression in the source natural language.

19. The computer-readable medium of claim 17, wherein creating the target natural language feature structure comprises matching the source natural language feature structure against set of bilingual example feature structures and substituting any portion of the source natural language feature structure that is matched.

20. The computer-readable medium of claim 17, wherein creating the target natural language feature structure comprises building a transfer generation data structure from the source natural language feature structure.

21. The computer-readable medium of claim 20, wherein the transfer generation data structure comprises a plurality of sub-transfer generation data structures and building the transfer generation data structure comprises invoking a plurality of sub-transfer processes, each sub-transfer process responsible for building a sub-transfer generation data structure.

22. The computer-readable medium of claim 17, wherein building the syntax parsing data structure comprises:

creating nodes in a syntax data structure by applying a set of rules in the compiled parsing grammar as directed by a series of parsing actions, each node associated with a feature structure representing at least a portion of the expression and any feature structure created at a root node of the syntax data structure representing the expression.

23. The computer-readable medium of claim 22, wherein the parsing actions in the series are selected from a parsing table associated with the compiled parsing grammar for the natural language.

24. The computer-readable medium of claim 22, wherein the rules in the set are determined based on the feature structures associated with the nodes.

25. The computer-readable medium of claim 17, wherein creating the target natural language feature structure comprises:

substituting a target natural language feature structure representing the expression for a source natural language feature structure representing the expression when the source natural language feature structure matches a bilingual example feature structure;

applying a set of compiled transfer grammar rules to the source language feature structure to build a transfer generation data structure having a plurality of source language feature sub-structures representing portions of the expression;

substituting a target natural language feature sub-structure representing a portion of the expression for a source natural language feature sub-structure representing the portion when the source natural language feature sub-structure matches a bilingual example feature structure; and separately applying a specific set of compiled transfer grammar rules to each source natural language feature sub-structure that does not match a bilingual feature structure to build a plurality of transfer generation data structures to create new source natural language feature sub-structures until a target natural language feature sub-structure has been substituted for each source natural language feature sub-structure.

26. The computer-readable medium of claim 25, wherein creating the target natural language feature structure further comprises:

determining the specific set of compiled transfer grammar rules to apply based on each source natural language feature sub-structure that does not match a bilingual feature structure.

27. The computer-readable medium of claim 25, wherein the transfer generation data structure comprises:

a root node associated with a first source language feature sub-structure, the first source language feature sub-structure representing a portion of the expression;

at least one rule node below the root node, the at least one rule node being associated with one rule from the specific set of compiled transfer grammar rules; and at least one symbol node below the at least one rule node, the at least one symbol node being associated with a source language feature sub-structure for a part of the portion.

28. The computer-readable medium of claim 17, wherein building the syntactic generation data structure comprises:

applying a set of compiled generation grammar rules to build a syntactic generation data structure from a feature structure representing at least one version of the expression; and choosing a list of feature structures associated with leaf nodes in the syntactic generation data structure to represent the expression.

29. The computer-readable medium of claim 28, wherein applying the set of compiled generation grammar rules comprises:

repeatedly applying a specific set of compiled generation grammar rules to a feature structure associated with a symbol node to create a level of rule nodes below the symbol node, each rule node associated with a rule satisfied by the feature structure; and repeatedly applying the rule associated with a rule node to the symbol node above the rule node to create a level of symbol nodes below the rule node, each symbol node associated with a feature structure created by applying the rule, until the features structures associated with the symbol nodes represent words in the expression.

30. The computer-readable medium of claim 28, wherein choosing the list of feature structures comprises tracing a traverse path through the data structure until all leaf nodes on the traverse path have been reached.

31. The computer-readable medium of claim 28, wherein choosing the list of feature structures results in a single version of the expression.

32. The computer-readable medium of claim 28, wherein choosing the list of feature structures results in multiple versions of the expression.

33. A system for translating an expression from a source natural language into a target natural language using compiled grammars using compiled grammars generated from grammar rules compiled by a grammar programming language compiler, the system comprising:

a processing unit;

a memory coupled to the processing unit through a system bus;

a computer-readable medium coupled to the processing unit through the system bus and containing thereon the compiled grammars comprising a compiled parsing grammar, a compiled transfer grammar and a compiled generation grammar;

a plurality of language-neutral modules executed from the computer-readable medium by the processing unit, the plurality of language-neutral modules causing the processing unit to apply rules in the compiled grammars to a representation of the expression in the source natural language to create a representation of the expression in the target natural language, wherein the plurality of language-neutral modules comprises:

a syntactic analysis module that causes the processing unit to build a syntax data structure from the representation of the expression in the source natural language by executing the instructions in the interface functions for the rules in the compiled parsing grammar;

a transfer module that causes the processing unit to create a representation for the expression in the target natural language corresponding to the representation of the expression in the source natural language contained in the syntax data structure by executing the instructions in the interface functions for the rules in the compiled transfer grammar; and a syntactic generation module that causes the processing unit to build a syntactic generation data structure from the representation of the expression in the target natural language by executing the instructions in the interface functions for the rules in the compiled generation grammar, the syntactic generation data structure representing at least one valid translation of the expression; and a plurality of interface functions executed from the computer-readable medium by the processing unit, each interface function associated with a rule in one of the compiled grammars, wherein applying a rule in the compiled grammar causes the processing unit to execute instructions in the interface function corresponding to the rule.

34. The system of claim 33, wherein the representations of the expression are feature structures and executing the instructions in an interface function causes the processing unit to expand an input feature structure into a plurality of disjunctive feature structures, to apply selected rules from the compiled grammar to each of the plurality of disjunctive feature structures to create a new plurality of disjunctive feature structures, and to combine the new plurality of disjunctive feature structures to create an output feature structure.

35. The system of claim 34, wherein each rule in the compiled grammar comprises a context-free rule and an associated rule body and the plurality of language-neutral modules further cause the processing unit to select the rules by evaluating the input feature structure against the rule bodies.

36. The system of claim 34, wherein the plurality of disjunctive feature structures comprises only disjunctive feature structures that are referenced by the selected rules.

37. An apparatus for translating an expression from a source natural language to a target natural language using compiled grammars generated from grammar rules compiled by a grammar programming language compiler, the apparatus comprising:

means for building a syntax parsing data structure for the expression as directed by a compiled parsing grammar, the syntax parsing data structure containing a source natural language feature structure for the expression;

means for creating a target natural language feature structure for the expression from the source natural language feature structure for the expression as directed by a compiled transfer grammar; and means for building a syntactic generation data structure from the target natural language feature structure as directed by a compiled generation grammar, the syntactic generation data structure representing at least one valid translation of the expression.

38. The apparatus of claim 37, wherein the means for building a syntax parsing data structure comprises:

using a plurality of feature structures, each representing a word in the expression in the source natural language.

39. The apparatus of claim 37, wherein the means for creating a target natural language feature structure comprises:

means for matching the source natural language feature structure against a set of bilingual example feature structures; and means for substituting any portion of the source natural language feature structure that is matched.

40. The apparatus of claim 37, wherein the means creating the target natural language feature structure comprises:

means for building a transfer generation data structure from the source natural language feature structure.

41. The apparatus of claim 40, wherein the transfer generation data structure comprises a plurality of sub-transfer generation data structures and the means for building the transfer generation data structure comprises:

means for invoking a plurality of sub-transfer processes, each sub-transfer process responsible for building a sub-transfer generation data structure.

42. The apparatus of claim 37, wherein the means for building the syntax parsing data structure comprises:

means for creating nodes in the syntax data structure by applying a set of rules in the compiled parsing grammar as directed by a series of parsing actions, each node associated with a feature structure representing at least a portion of the expression and any feature structure created at a root node of the syntax data structure representing the expression.

43. The apparatus of claim 42, wherein the parsing actions in the series are selected from a parsing table associated with the compiled parsing grammar for the natural language.

44. The apparatus of claim 42, wherein the rules in the set are determined based on the feature structures associated with the nodes.

45. The apparatus of claim 37, wherein the means for creating the target natural language feature structure comprises:

means for substituting a target natural language feature structure representing the expression for a source natural language feature structure representing the expression when the source natural language feature structure matches a bilingual example feature structure;

means for applying a set of compiled transfer grammar rules to the source language feature structure to build a transfer generation data structure having a plurality of source language feature sub-structures representing portions of the expression;

means for substituting a target natural language feature sub-structure representing a portion of the expression for a source natural language feature sub-structure representing the portion when the source natural language feature sub-structure matches a bilingual example feature structure; and means for separately applying a specific set of compiled transfer grammar rules to each source natural language feature sub-structure that does not match a bilingual feature structure to build a plurality of transfer generation data structures to create new source natural language feature sub-structures until a target natural language feature sub-structure has been substituted for each source natural language feature sub-structure.

46. The apparatus of claim 45, wherein the means for creating the target natural language feature structure further comprises:

means for determining the specific set of compiled transfer grammar rules to apply based on each source natural language feature sub-structure that does not match a bilingual feature structure.

47. The apparatus of claim 45, wherein the transfer generation data structure comprises:

a root node associated with a first source language feature sub-structure, the first source language feature sub-structure representing a portion of the expression;

at least one rule node below the root node, the at least one rule node being associated with one rule from the specific set of compiled transfer grammar rules; and at least one symbol node below the at least one rule node, the at least one symbol node being associated with a source language feature sub-structure for a part of the portion.

48. The apparatus of claim 40, wherein the means for building the syntactic generation data structure comprises:

means for applying a set of compiled generation grammar rules to build a syntactic generation data structure from a feature structure representing at least one version of the expression; and means for choosing a list of feature structures associated with leaf nodes in the syntactic generation data structure to represent the expression.

49. The apparatus of claim 47, wherein the means for applying the set of compiled generation grammar rules comprises:

means for repeatedly applying a specific set of compiled generation grammar rules to a feature structure associated with a symbol node to create a level of rule nodes below the symbol node, each rule node associated with a rule satisfied by the feature structure; and means for repeatedly applying the rule associated with a rule node to the symbol node above the rule node to create a level of symbol nodes below the rule node, each symbol node associated with a feature structure created by applying the rule, until the features structures associated with the symbol nodes represent words in the expression.

50. The apparatus of claim 47, wherein the means for choosing the list of feature structures comprises tracing a traverse path through the data structure until all leaf nodes on the traverse path have been reached.

51. The apparatus of claim 47, wherein the means for choosing the list of feature structures produces a single version of the expression.

52. The apparatus of claim 47, wherein the means for choosing the list of feature structures produces multiple versions of the expression.

* * * * *